US011340459B2

(12) United States Patent
Foote et al.

(10) Patent No.: US 11,340,459 B2
(45) Date of Patent: May 24, 2022

(54) STEERABLE RETICLE FOR VISOR PROJECTED HELMET MOUNTED DISPLAYS

(71) Applicant: Rockwell Collins, Inc., Cedar Rapids, IA (US)

(72) Inventors: Bobby D. Foote, Berea, KY (US); Erin M. Hawk, Cedar Rapids, IA (US); Josh Rivera, Marion, IA (US); Michael Ropers, Cedar Rapids, IA (US); Andrew Jarrett, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 80 days.

(21) Appl. No.: 16/812,184

(22) Filed: Mar. 6, 2020

(65) Prior Publication Data
US 2020/0285059 A1 Sep. 10, 2020

Related U.S. Application Data

(60) Provisional application No. 62/815,084, filed on Mar. 7, 2019.

(51) Int. Cl.
*G02B 27/01* (2006.01)
*B64D 43/00* (2006.01)
*G06F 3/01* (2006.01)

(52) U.S. Cl.
CPC ......... *G02B 27/0172* (2013.01); *B64D 43/00* (2013.01); *G02B 27/0179* (2013.01); *G02B 27/0189* (2013.01); *G06F 3/013* (2013.01); *G02B 2027/0141* (2013.01); *G02B 2027/0187* (2013.01)

(58) Field of Classification Search
CPC combination set(s) only.
See application file for complete search history.

(56) References Cited

U.S. PATENT DOCUMENTS

2012/0105310 A1* 5/2012 Sverdrup ........... G02B 27/0172
345/8
2015/0217145 A1* 8/2015 Teetzel .................. A62B 9/006
359/885

OTHER PUBLICATIONS

Examination Report in European Application No. 2000099.0 dated Jan. 21, 2022, 6 pages.

* cited by examiner

*Primary Examiner* — Robin J Mishler
(74) *Attorney, Agent, or Firm* — Suiter Swantz pc llo

(57) ABSTRACT

A helmet mounted display system is described. A visor has an inner reflective surface and is mountable to head gear. A light source is arranged to emit light. Directing optics are arranged to image light from the light source onto the inner reflective surface of the visor to provide a reticle image on the inner reflective surface of the visor. An eye tracker is configured to determine the orientation of an eye of a wearer of the head gear. A controller is configured to receive an indication of the determined orientation of the eye, and to control the at least one actuator to change the orientation and shape of the directing optics to change the position of reticle image based on the indication of the determined orientation of the eye such that the eye views the reticle image.

20 Claims, 6 Drawing Sheets

STEERABLE RETICLE FOR VISOR PROJECTED HELMET MOUNTED DISPLAYS

CROSS-REFERENCE TO RELATED PATENT APPLICATIONS

This application claims the benefit of and priority to U.S. Provisional Patent Application Ser. No. 62/815,084 filed Mar. 7, 2019, entitled "Steerable Reticle For Visor Projected Helmet Mounted Displays," which is incorporated by reference in its entirety herein.

BACKGROUND

Advanced helmet-mounted displays (HMDs) can provide an aircraft pilot with a full 360-degree view of the surrounding environment by combining exterior sensor feeds, essentially enabling the pilot to see through the aircraft exterior in all directions while augmenting the view with relevant information about surrounding objects (e.g., their distance from the aircraft, their velocity and bearing, identifying details of proximate aircraft). Off-visor HMD systems utilize a reflective coating on the inside of the HMD's visor, projecting fused sensor output through optics substantially aligned with the pilot's eyes. The reflective coating reflects the projected imagery into the pilot's eyes without blocking the pilot's field of view with physical components.

HMD systems may include target tracking functionality using a reticle displayed in a main field of view (FOV). HMD systems may have a main FOV of approximately 40°×30°, for example, with the reticle displayed in the main FOV.

Off axis target tracking may be implemented using an optical assembly to display a reticle on the visor outside of the main FOV. Such off axis target tracking systems, however, provide the target tracking reticle in a fixed location of the visor.

SUMMARY

In one aspect, embodiments of the inventive concepts disclosed herein are directed to a HMD system. A visor has an inner reflective surface and is mountable to head gear. A light source is arranged to emit light. Directing optics are arranged to image light from the light source onto the inner reflective surface of the visor to provide a reticle image on the inner reflective surface of the visor. At least one actuator is configured to change the orientation and shape of the directing optics to change the position of the reticle image on the inner reflective surface of the visor provided by the directing optics. An eye tracker is configured to determine the orientation of an eye of a wearer of the head gear. A controller is configured to receive an indication of the determined orientation of the eye, and to control the at least one actuator to change the orientation and shape of the directing optics to change the position of reticle image based on the indication of the determined orientation of the eye such that the eye views the reticle image.

In a further aspect, embodiments of the inventive concepts disclosed herein are directed to a HMD system having a visor and multiple steerable light assemblies. The visor has an inner reflective surface and is mountable to head gear. Each steerable light assembly includes a light source arranged to emit light, directing optics arranged to image light from the light source onto the inner reflective surface of the visor to provide a reticle image on the inner reflective surface of the visor, and at least one actuator configured to change the orientation and shape of the directing optics to change the position of the reticle image on the inner reflective surface of the visor provided by the directing optics. At least one eye tracker is configured to determine the orientation of an eye of a wearer wearing the head gear. A controller is configured to receive an indication of the determined orientation of the eye, and to control, for a respective of the multiple steerable light assemblies, a respective of the at least one actuator to change the orientation and shape of the directing optics to change the position of reticle image based on the indication of the determined orientation of the eye such that the eye views the reticle image.

In a further aspect, embodiments of the inventive concepts disclosed herein are directed to a HMD system. A visor has an inner reflective surface and is mountable to head gear. A light source is arranged to emit light. Directing optics are arranged to image light from the light source onto the inner reflective surface of the visor to provide a reticle image on the inner reflective surface of the visor. At least one actuator is configured to change the orientation and shape of the directing optics to change the position of the reticle image on the inner reflective surface of the visor provided by the directing optics. An eye tracker is configured to determine the orientation of an eye of a wearer of the head gear. A controller is configured to receive an indication of the determined orientation of the eye, and to control the at least one actuator to change the orientation and shape of the directing optics to change the position of reticle image based on the indication of the determined orientation of the eye such that the eye views the reticle image. The visor has a first region corresponding to a main field of view on the inner reflective surface of the visor, and a second region on the inner reflective surface of the visor outside the main field of view, wherein the position of the reticle image includes the second region. A main optical system is configured to provide a video image in the first region.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regard HMDs with an off axis targeting capability incorporating an eye tracker and a steerable light assembly. The eye tracker and steerable light assembly allow for a reticle to be moved on the inside surface of a visor, including outside the main FOV, based on a determined orientation of an eye. In this way a wearer of the HMD may allow the reticle to track the movement of an eye viewing the reticle. This approach has minimal impact to the main field of view of a pilot (wearing the helmet with HMD). A pilot may quickly steer a reticle using eye tracking outside the HMD main FOV. A pilot may include but is not limited to a human being controlling or operating an air vehicle. A pilot may include, for example, a human being controlling or operating other types of vehicles, a human being remotely controlling or operating a vehicle, or an artificial intelligence system configured to control or operate a vehicle. An eye of a pilot may include, for example, an eye of a human being, a device configured to interact with an eye tracker, or an artificial intelligence system configured to function as a receiver, transmitter, processor, refractor, or reflector of light signals.

Figure 1:
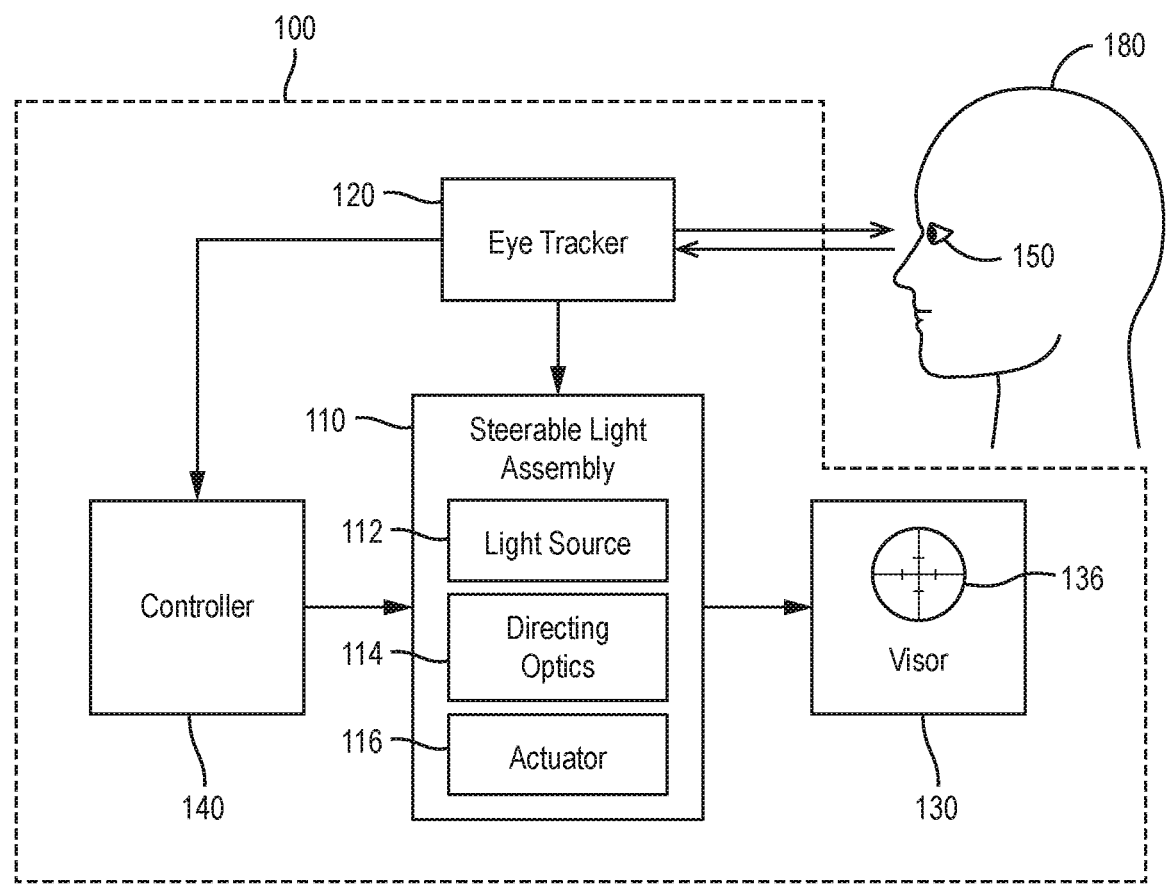
FIG. 1 is a schematic illustrating a HMD with a steerable light assembly according to inventive concepts disclosed herein.

FIG. 1 is a schematic illustrating an HMD 100 with a steerable light assembly 110 according to inventive concepts disclosed herein. The HMD 100 includes, in addition to the steerable light assembly 110, an eye tracker 120, a visor 130 and a controller 140. The steerable light assembly 110 includes a light source 112, directing optics 114, and at least one actuator 116.

Figure 2A:
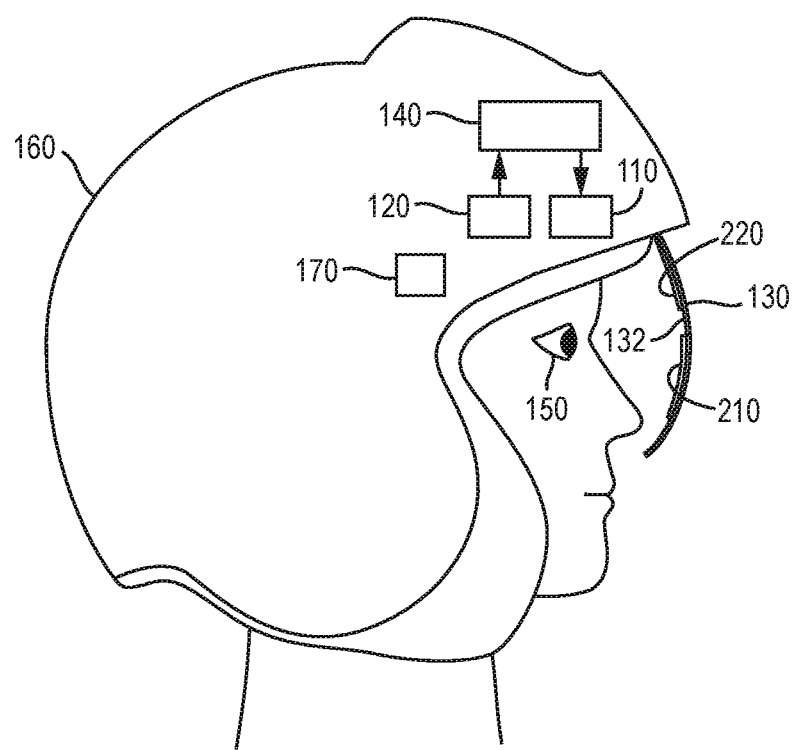
FIG. 2A is a schematic illustrating a head gear incorporating a HMD according to inventive concepts disclosed herein.
Figure 2B:
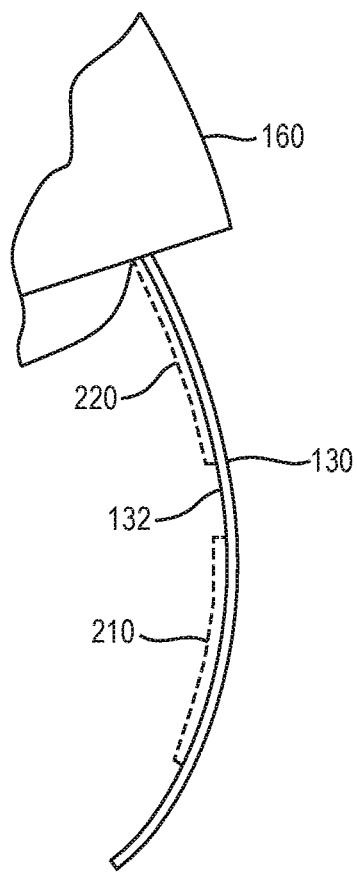
FIG. 2B is a schematic illustrating a HMD visor according to the inventive concepts disclosed herein.

The visor 130 may have an inner reflective surface 132, as shown in FIG. 2. The visor 130 may be mounted to a head gear 160, such as a helmet as shown in FIG. 2.

Figure 3A:
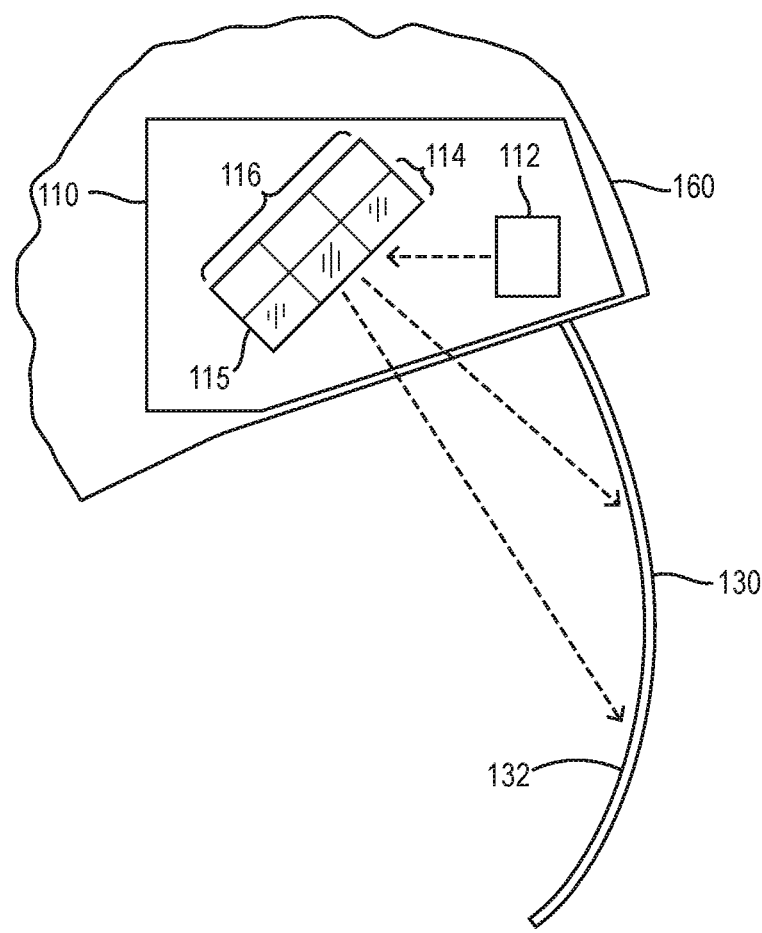
FIG. 3A is a schematic illustrating a steerable light assembly according to inventive concepts disclosed herein.
Figure 3B:
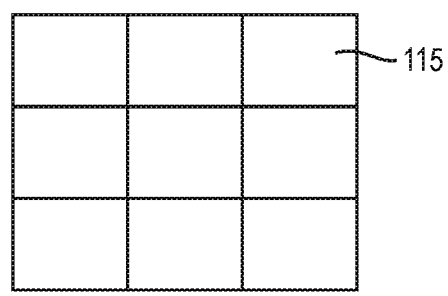
FIG. 3B is a top view of an array of optics components for the steerable light assembly of FIG. 3A.

Referring to FIGS. 1, 3A and 3B, the light source 112 is arranged to emit light. The light source 112 may be a laser or a light emitting diode, for example. The light source 112 may emit monochrome light of one specific color, or may emit multiple colors. The light source 112 may emit full color light. Thus, the light source 112 may provide light for a monochrome display, or a full color display, for example. The light source may 112 provide visible light such that the light may be viewed by a human eye.

The directing optics 114 of the steerable light assembly 110 may be arranged to image light from the light source 112 onto the inner reflective surface 132 of the visor 130 to provide a reticle image 136 (see reticle image 136 in FIG. 4) on the inner reflective surface 132 of the visor 130. In this regard, the at least one actuator 116 is configured to change the orientation or shape of the directing optics 114 to change the position of the reticle image 136 on the inner reflective surface 132 of the visor 130 provided by the directing optics 114.

Figure 5:
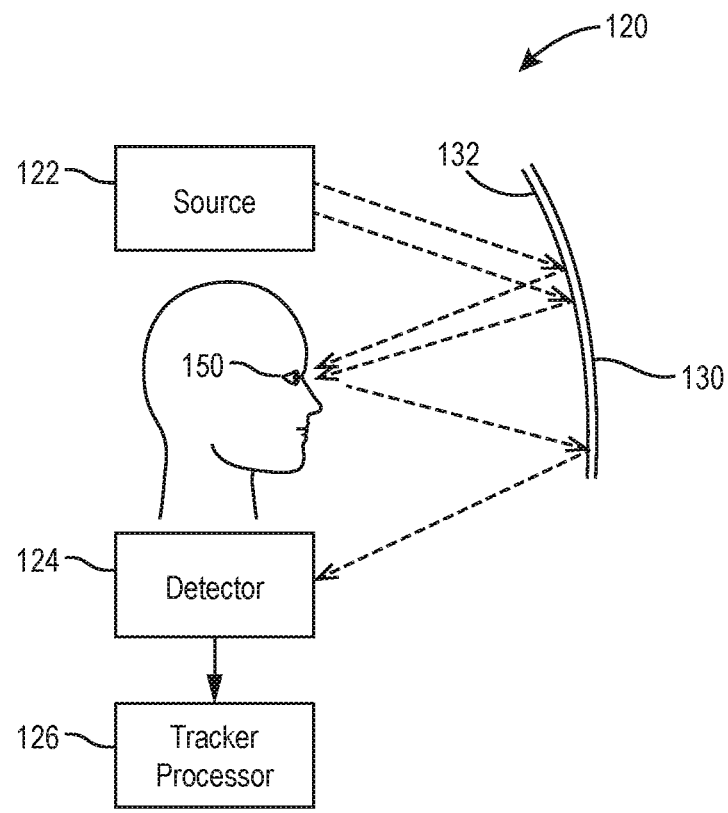
FIG. 5 is a schematic illustrating an eye tracker according to inventive concepts disclosed herein.

Referring to FIG. 5, the eye tracker 120 is configured to determine orientation of an eye 150 of a wearer of the head gear 160, such as a helmet. The eye tracker 120 may include an infra-red (IR) light source 122 arranged to provide IR light to the eye 150. In this regard, the IR light source 122 may direct IR light to reflect off the inner reflective surface 132 of the visor 130 to the eye 150.

The eye tracker 120 may include an IR detector 124 arranged to detect IR light from the IR light source 122 which is reflected off the eye 150, and then reflected off the inner reflective surface 132 of the visor 130 to the IR detector 124. The IR detector 124 may be an IR camera, for example.

The eye tracker 120 may further include a tracker processor 126. The tracker processor 126 may be configured to determine the orientation of the eye 150 based on the detected IR light from the IR detector 124. An example of an eye tracker may be found, for example, in U.S. Nonprovisional application Ser. No. 16/104,331 entitled "LOW PROFILE HMD EYE TRACKER" filed Aug. 17, 2018, which is incorporated by reference in its entirety.

The controller 140 is configured to receive an indication of the determined orientation of the eye 150 from the eye tracker 120. The controller 140 controls the at least one actuator 116 to change the orientation or shape of the directing optics 114 to change the position of reticle image 136. The controller 140 controls the at least one actuator 116 to change the orientation or shape of the directing optics 114 based on the indication of the determined orientation of the eye 150 such that the eye 150 views the reticle image 136.

Referring to FIG. 3A and FIG. 3B, the directing optics 114 may be, for example, a mirror with multiple optics components 115. The controller 140 may control the individual optics components 115 to change their shape or orientation via the actuators 116. The directing optics 114 and actuators 116 may be implemented as a micro-electro-mechanical (MEM) structure, or structures. The directing optics 114 may be made of a single optics component 115.

FIG. 3B illustrates a top view of the multiple optics components 115 arranged in an array. The array of optics components is shown as 3×3 in FIG. 3B for ease of illustration. In practice the size of the array may be much larger than 3×3.

The actuators 116 may be driven by the controller 140 to move the directing optics 114, for example a mirror, in two degrees of freedom. Thus, the controller 140 may drive the actuators 116 to orient the directing optics 114 so that the reticle image 136 is positioned as desired on the visor 130.

The reticle shape of the reticle image 136 may be implemented at the light source 112 stage, or at the stage of the directing optics 114. For example, the light source 112 may emit light with a reticle image therein. Alternatively, the directing optics 114 may be controlled to have a reticle shape therein, and thus the reticle image 136 may be implemented at the stage of the directing optics 114.

FIG. 2 illustrate the HMD system 100 mounted on head gear 160, such as a helmet, for example. The head gear may have incorporated therein, in addition to the visor 130, the steerable light assembly 110, eye tracker 120, and the controller 140. Further the head gear 160 may incorporate therein a main optical system 170 which provides images on the inner reflective surface 132 of the visor 130 within a main FOV.

Figure 4:
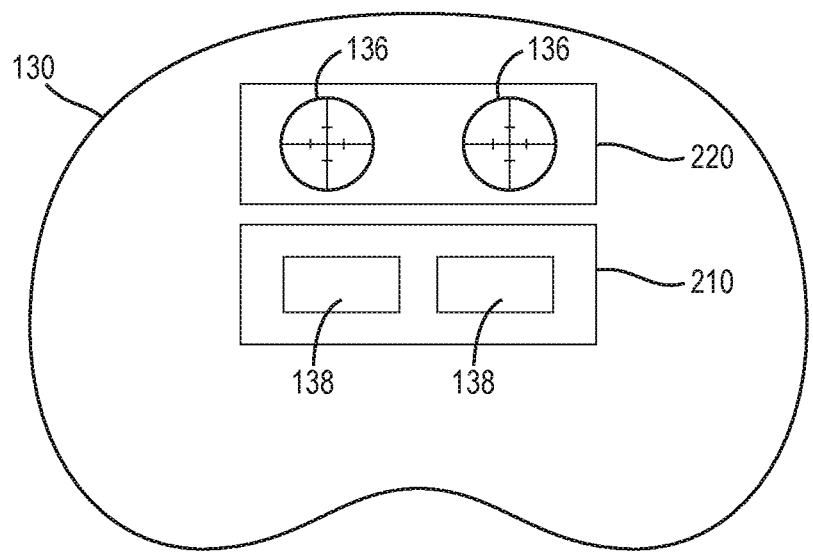
FIG. 4 illustrates a visor with first and second regions according to inventive concepts disclosed herein.

Referring to FIGS. 2 and 4, the visor 130 has a first region 210 and a second region 220. The first region 210 corresponds to a main FOV on the inner reflective surface 132 of the visor 130. The main FOV may be about 40°×30°, for example. The second region 220 is located on the inner reflective surface 132 of the visor 130 entirely outside the main FOV and the first region 210. The main optical system 170 provides main images 138 on the inner reflective surface 132 of the visor 130 within the main FOV. The main images 138 provided by the main optical system 120 may include flight information, such as aircraft heading, speed, and altitude information, for example.

The position of the reticle image 136 includes the second region 220, and may be entirely outside the first region 210. Alternatively, the reticle image 136 may have some overlap with the first region 210.

FIG. 4 illustrates a front view of the visor 130 with the first region 210 including two main images 138, one for each eye of a wearer of the head gear 160. Similarly, the second region 220 includes two reticle images 136, one for each eye of a wearer of the head gear 160. In this case the HMD system may include two steering light assemblies 110, and two eye trackers 120, one for each eye, such as described with respect to FIG. 8.

As described above, the steerable light assembly 110 may provide a reticle image 136 on the visor 130. Further, the steerable light assembly 110 may provide additional information in addition to the reticle image 136 on the visor 130. The additional information may include object targeting information, aircraft flight information, or other information, for example.

Figure 6:
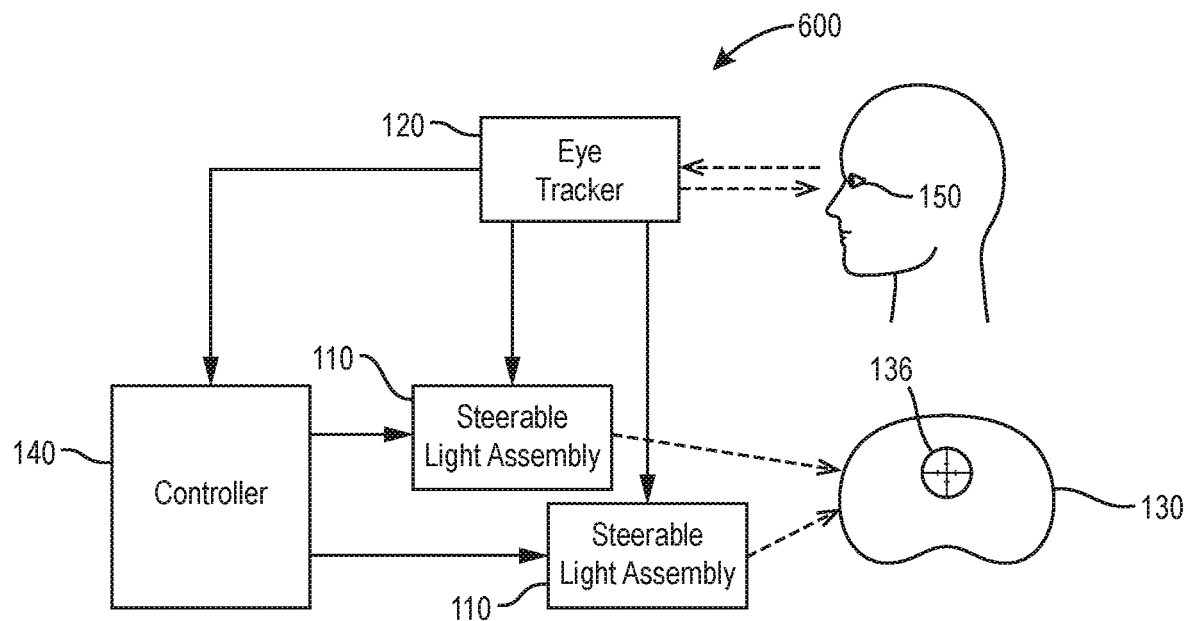
FIG. 6 is a schematic illustrating a HMD with multiple steerable light assemblies according to inventive concepts disclosed herein.

FIG. 6 illustrates a HMD system 600 according to embodiments of the inventive concepts disclosed herein including multiple steerable light assemblies 110. Each of the steerable light assemblies 110 includes a light source 112, directing optics 114 and at least one actuator 116 in a similar fashion to the HMD system 100 of FIG. 1.

Further, the HMD system 600 includes an eye tracker 120 configured to determine the orientation of an eye 150 of a wearer of head gear 160 (see FIG. 2). The controller 140 of the HMD system 600 is configured to receive an indication of the determined orientation of the eye 150 from the eye tracker 120. The controller 140 controls the at least one actuator 116 of a respective of the steerable light assemblies 110 to change the orientation of a respective of the directing optics 114 to change the position of the reticle image 136. The controller 140 controls a respective of the at least one actuators 116 to change the orientation of the directing optics 114 based on the indication of the determined orientation of the eye 150 such that the eye 150 views the reticle image 136.

Figure 7:
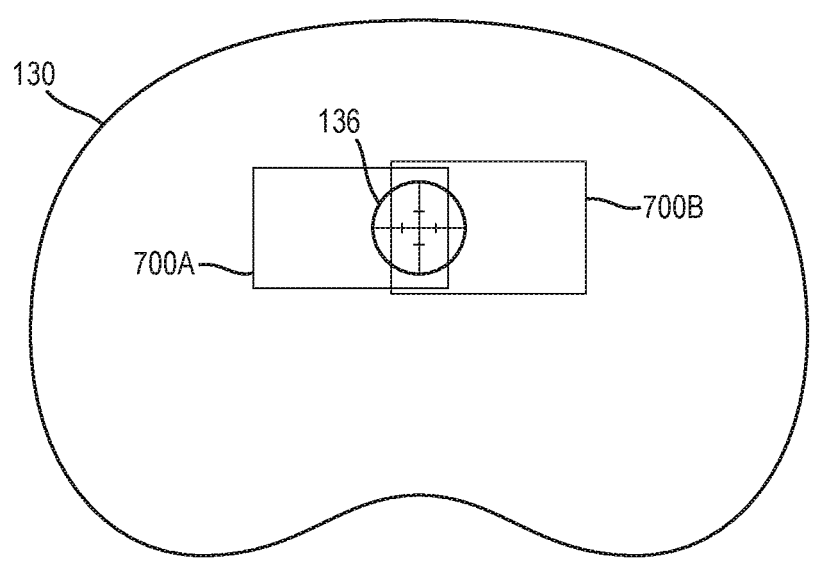
FIG. 7 illustrates a visor with overlapping FOVs according to inventive concepts disclosed herein.

FIG. 7 illustrates the FOVs 700A and 700B provided by the HMD system 600 for the case of two steerable light assemblies 110. One of the steerable light assemblies 110 provides the FOV 700A while the other of the steerable light assemblies 110 provides the FOV 700B. Together the two FOVs provide for a reticle image 136 on the visor 130. The FOV 700A and the FOV 700B may overlap, for example. Alternatively, the FOV 700A and the FOV 700B may not overlap.

FIGS. 6 and 7 illustrate a HMD system 600 with two steerable light assemblies 110. Alternatively, the HMD system 600 may have more than two steerable light assemblies 110, for example, where each of the steerable light assemblies 110 corresponds to a different FOV. The steerable light assemblies 110 may be arranged such that their corresponding FOVs overlap.

Systems with multiple steerable light assemblies 110 for each eye 50 allows for redundancy. Multiple light sources 112 and multiple direction optics 114 may provide redundancy that would tolerate a single failure without an impact to the functioning of the HMD system. Further, the steerable light assemblies 110 arranged such that their corresponding FOVs have substantial overlapping coverage similarly prevents loss of function.

Figure 8:
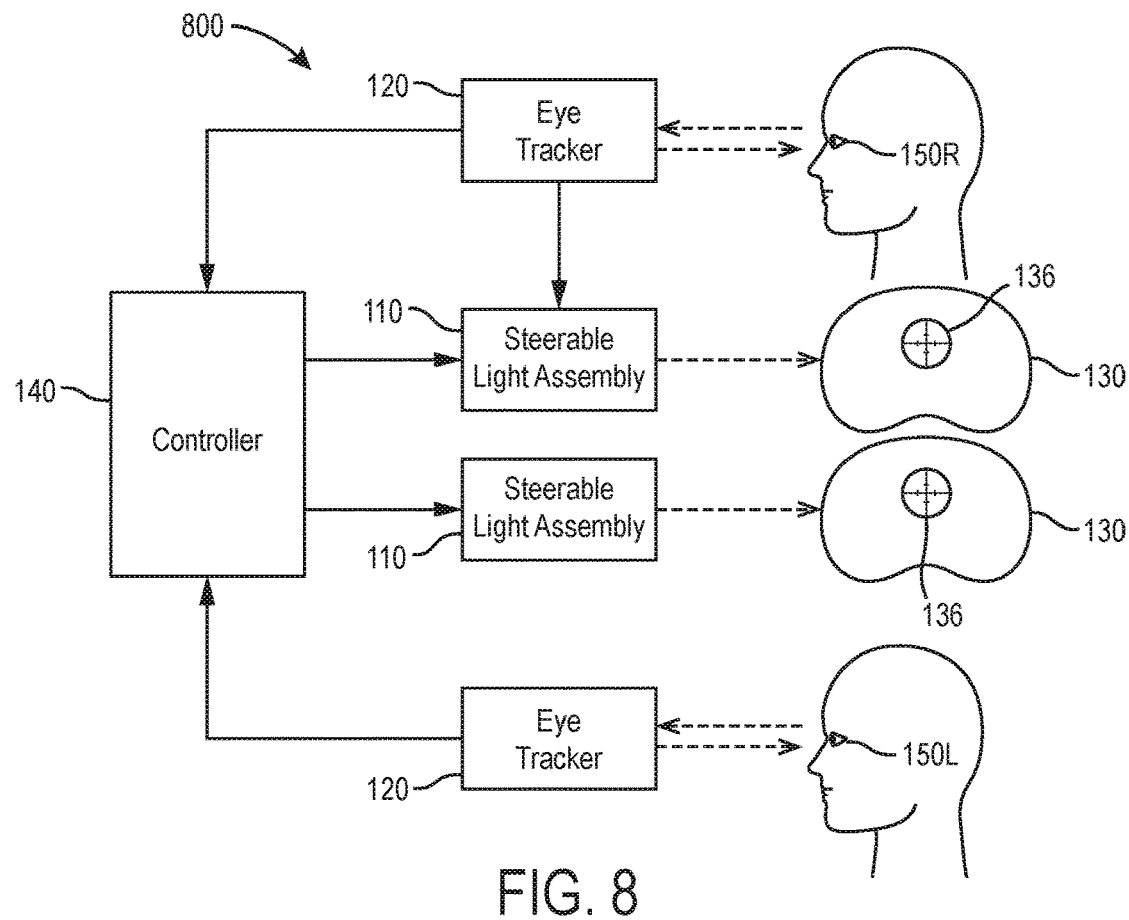
FIG. 8 is a schematic illustrating a HMD with steerable light assemblies and two eye trackers, one for a left eye and one for a right eye, according to inventive concepts disclosed herein.

FIG. 8 illustrates a HMD system 800 according to embodiments of the inventive concepts disclosed herein including two eye trackers 120, and respective steerable light assemblies 110. Each of the steerable light assemblies 110 includes a light source 112, directing optics 114 and at least one actuator 116 in a similar fashion to the HMD system 100 of FIG. 1 or the HMD system 600 of FIG. 6.

Further, the HMD system 800 includes an eye tracker 120 for each eye 150, i.e., one eye tracker 120 for a left eye 150L of the wearer, and the other eye tracker 120 for a right eye 150R of the wearer. Each of the eye trackers 120 is configured to determine the orientation of a respective eye 150 of a wearer of head gear 160 (see FIG. 2). A controller 140 of the HMD system 800 is configured to receive an indication of the determined orientation of a respective eye 150 from a respective eye tracker 120. The controller 140 controls the at least one actuator 112 of a respective of the steerable light assemblies 110 to change the orientation of a respective of the directing optics 114 to change the position of the reticle image 136 for each eye. The controller 140 controls a respective of the at least one actuators 116 to change the orientation of the directing optics 114 based on the indication of the determined orientation of a respective eye 150 such that the respective eye 150 views the reticle image 136.

Figure 9:
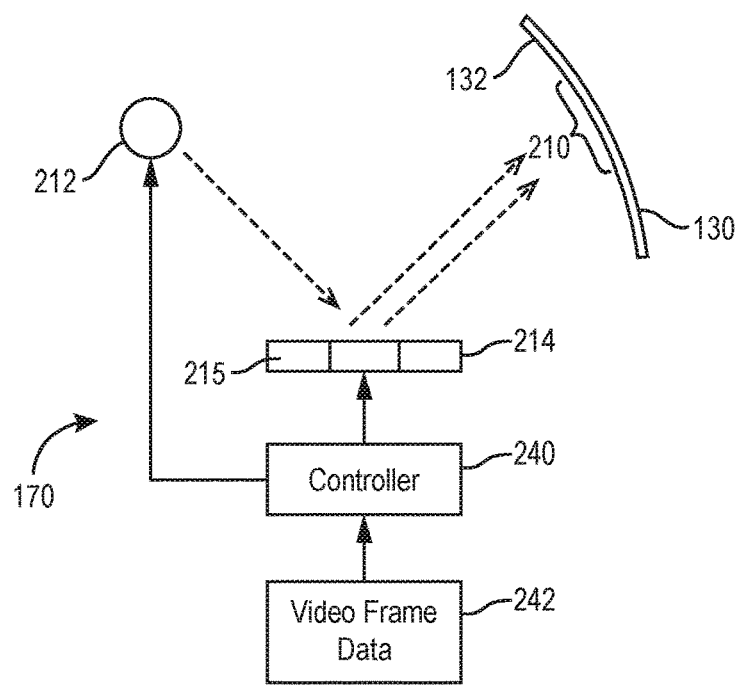
FIG. 9 is a schematic illustrating a main optical system according to inventive concepts disclosed herein.

FIG. 9 illustrates a main optical system 170 which may provide the main FOV of the first region 210. The main optical system 170 may include directing optics 214 and a light source 212 in a similar fashion to the steerable light assembly 110 of FIGS. 3A and 3B. The directing optics 214 may be, for example, a mirror with multiple optics components 215. The individual optics components 215 may be controlled to change their shape or orientation in a similar fashion to the steerable light assembly 110 of FIGS. 3A and 3B via a controller 240. The directing optics 214 may be implemented as a micro-electro-mechanical (MEM) structure, or structures. The main optical system 170 further includes a video source 242 have video frame data.

The controller 240 receives video data from the video source 242 and controls the directing optics 214 and light source 212 based on the video data. The controller 240 controls video frames from the video data to be raster scanned in combination with modulating light from the light source 212, which may provide collimated light to the directing optics 214. Each pixel in a raster scan pattern is displayed on the first region 210 of the visor 130 by controlling the shape or orientation of the individual optics components 215. Each pixel is projected on a desired location of the visor 130 while simultaneously modulating light from the light source 212 according to a desired pixel brightness and/or color. The controller 240 may repeat the process for each pixel in a line and for every line in a video frame at a high enough rate that a user perceives the video frame as an image. The controller 240 may repeat the process for each frame.

As mentioned above, embodiments of the inventive concepts disclosed herein regard HMDs with an off axis targeting capability incorporating an eye tracker and a steerable light assembly. The eye tracker and steerable light assembly allow for a reticle to be moved on the inside surface of a visor, including outside the main FOV, based on a determined orientation of an eye. In this way a wearer of the HMD may allow the reticle to track the movement of an eye viewing the reticle. This approach has minimal impact to the main field of view of a pilot (wearing the helmet with HMD). A pilot may quickly steer a reticle using eye tracking outside the HMD main FOV.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. A helmet mounted display (HMD) system comprising:
   a visor comprising an inner reflective surface and mountable to head gear;
   a light source arranged to emit light;
   directing optics arranged to image light from the light source onto the inner reflective surface of the visor to provide a reticle image directly on the inner reflective surface of the visor, wherein the reticle image is a target-tracking reticle image;
   at least one actuator configured to change the orientation and shape of the directing optics to change the position of the reticle image on the inner reflective surface of the visor provided by the directing optics;
   an eye tracker configured to determine the orientation of an eye of a wearer of the head gear; and
   a controller configured to receive an indication of the determined orientation of the eye, and to control the at least one actuator to change the orientation and shape of the directing optics to change the position of the reticle image based on the indication of the determined orientation of the eye such that the eye views the reticle image,
   wherein the visor further comprises:
   a first region corresponding to a main field of view on the inner reflective surface of the visor, and
   a second region on the inner reflective surface of the visor outside the main field of view, wherein the position of the reticle image includes the second region,
   wherein the first region comprises a main field of view image and the controller is further configured to change the position of the reticle image independently from the main field of view image.

2. The system of claim 1, wherein the visor has
   a first region corresponding to a main field of view on the inner reflective surface of the visor, and
   a second region on the inner reflective surface of the visor outside the main field of view, wherein the position of reticle image includes the second region.

3. The system of claim 2, wherein the main field of view is about 40°×30°.

4. The system of claim 1, wherein the directing optics and at least one actuator include a micro-electro-mechanical (MEM) structure.

5. The system of claim 4, wherein the directing optics and at least one actuator include multiple micro-electro-mechanical (MEM) structures.

6. The system of claim 1, wherein the eye tracker includes an infra-red (IR) light source arranged to provide IR light to the eye of the wearer.

7. The system of claim 6, wherein the eye tracker includes an IR detector arranged to detect IR light from the eye of the wearer.

8. The system of claim 7, wherein the eye tracker includes a tracker processor configured to determine the orientation of the eye of the wearer based on the detected IR light from the IR detector.

9. The system of claim 7, wherein the IR detector includes an IR camera.

10. The system of claim 1, wherein the light source includes at least one of a laser or a light emitting diode.

11. The system of claim 1, wherein the light source emits at least one of monochrome light or full color light.

12. The system of claim 1, wherein the directing optics is arranged to image light from the light source onto the inner reflective surface of the visor to provide additional information in addition to the reticle image on the inner reflective surface of the visor.

13. The system of claim 12, wherein the additional information includes object targeting information or aircraft flight information.

14. A helmet mounted display (HMD) system comprising:
    a visor comprising an inner reflective surface and mountable to head gear;
    multiple steerable light assemblies, each steerable light assembly comprising:
    a light source arranged to emit light;
    directing optics arranged to image light from the light source onto the inner reflective surface of the visor to provide a reticle image directly on the inner reflective surface of the visor, wherein the reticle image is a target-tracking reticle image; and
    at least one actuator configured to change the orientation and shape of the directing optics to change the position of the reticle image on the inner reflective surface of the visor provided by the directing optics;
    at least one eye tracker configured to determine the orientation of an eye of a wearer wearing the head gear; and
    a controller configured to receive an indication of the determined orientation of the eye, and to control, for a respective of the multiple steerable light assemblies, a respective of the at least one actuator to change the orientation and shape of the directing optics to change the position of the reticle image based on the indication of the determined orientation of the eye such that the eye views the reticle image,
    wherein the visor further comprises:
    a first region corresponding to a main field of view on the inner reflective surface of the visor, and
    a second region on the inner reflective surface of the visor outside the main field of view, wherein the position of the reticle image includes the second region,
    wherein the first region comprises a main field of view image and the controller is further configured to change the position of the reticle image independently from the main field of view image.

15. The system of claim 14, wherein each steerable light assembly provides a different field of view.

16. The system of claim 14, wherein different field of views overlap each other.

17. The system of claim 14, wherein
    the multiple steerable light assemblies include a left eye steerable light assembly, a right eye steerable light assembly,
    and the at least one eye tracker includes a left eye tracker and a right eye tracker.

18. A method for providing a steerable reticle on a helmet mounted display (HMD), the method comprising:
    mounting a visor comprising an inner reflective surface to a head gear, wherein the visor has a first region corresponding to a main field of view on the inner reflective surface of the visor, and a second region on the inner reflective surface of the visor outside the main field of view, wherein the position of the reticle image includes the second region;

providing a light source arranged to emit light;

arranging directing optics to image light from the light source onto the inner reflective surface of the visor to provide a reticle image directly on the inner reflective surface of the visor;

controlling at least one actuator to change the orientation and shape of the directing optics to vary the position of the reticle image on the inner reflective surface of the visor provided by the directing optics;

determining, by an eye tracker device, the orientation of an eye of a wearer of the head gear;

receiving an indication of the determined orientation of the eye, and controlling the at least one actuator to change the orientation and shape of the directing optics to vary the position of reticle image based on the indication of the determined orientation of the eye such that the eye views the reticle image; and providing a main optical system configured to provide a video image in the first region, wherein the controlling based on the indication of the determined orientation of the eye is configured to change the position of the reticle image independently from the video image.

19. The method of claim 18, further comprising providing a main optical system, wherein the main optical system includes:
a video source including video data; and
a video controller configured to provide the video image based on the video data from the video source.

20. The method of claim 19, further comprising providing a main optical system, wherein the main optical system further includes:
a main light source; and
main directing optics,
wherein the video controller is configured to control the main directing optics to raster scan the video data in combination with light from the main light source.

* * * * *